United States Patent
Boisvert

Patent Number: 5,885,039
Date of Patent: Mar. 23, 1999

[54] QUICK TOOL RELEASE MECHANISM FOR VERTICAL MILLING MACHINES

[76] Inventor: Marc H. Boisvert, 12 Willobrae Dr., Peabody, Mass. 01960

[21] Appl. No.: 858,213

[22] Filed: May 10, 1997

Related U.S. Application Data

[63] Continuation-in-part of Ser. No. 794,336, Feb. 3, 1997.

[51] Int. Cl.⁶ .............................. B23C 9/00; B23B 31/10
[52] U.S. Cl. .................... 409/232; 408/239 A; 409/233; 409/234
[58] Field of Search ..................... 409/232, 233, 409/234, 131, 231; 408/239 R, 239 A

[56] References Cited

U.S. PATENT DOCUMENTS

| | | | |
|---|---|---|---|
| 3,264,941 | 8/1966 | Miraglia | 409/131 |
| 3,304,837 | 2/1967 | Perman | 409/234 |
| 3,586,343 | 6/1971 | Reed | 409/232 |
| 3,790,296 | 2/1974 | Mottu et al. | 408/239 R |
| 3,851,562 | 12/1974 | Tomita et al. | 409/233 |
| 4,583,890 | 4/1986 | Ewing et al. | 408/239 A |
| 4,642,005 | 2/1987 | Kondo et al. | 409/232 |
| 5,030,047 | 7/1991 | Pfalzgraf | 409/234 |
| 5,265,990 | 11/1993 | Kuban | 409/232 |
| 5,639,194 | 6/1997 | Harroun | 409/233 |
| 5,678,967 | 10/1997 | Savoie | 409/233 |

FOREIGN PATENT DOCUMENTS

| | | | |
|---|---|---|---|
| 1627079 | 2/1970 | Germany | 409/234 |

*Primary Examiner*—William Briggs
*Attorney, Agent, or Firm*—Don Halgren

[57] ABSTRACT

The present invention relates to a tool/collet alignment and securement arrangement for a vertical milling machine having a J-head and a manually adjustable spindle for the secure and rapid change of a tool held in a collet in a lower end of the spindle. An arrangement of receiving bores are spaced annularly around the lower end of the spindle. An arrangement of locating pins are correspondingly arranged about the tool/collet so as to mate with the receiving bores in the spindle, to provide secure and efficient engagement of the collet/tool with the spindle in the vertical milling machine.

8 Claims, 4 Drawing Sheets

QUICK TOOL RELEASE MECHANISM FOR VERTICAL MILLING MACHINES

This invention relates to vertical milling machines and more particularly to, quick release tools to permit those vertical milling machines to be utilized more efficiently, and is a Continuation-In-Part application of my copending U.S. patent application Ser. No. 08/794,336 filed Feb. 03, 1997.

BACKGROUND OF THE INVENTION

1. Field of the Invention
2. Prior Art

Metal milling machines have been around for many years. One very common one is the Bridgeport type universal standard vertical milling machine. This type of milling machine may be characterized by a vertical spindle, which spindle is manually activated by a handle, to pull a tool towards and push it away from a surface to be worked.

In a Bridgeport type universal milling machine, a collet is utilized to hold a specific tool. The collet is removed and a new collet is put in its place in the spindle, with a new tool in the new collet. The collet provides a machined surface so as to accurately mate with the spindle, thereby maintaining accuracy of the tool during its milling operation. Such a collet may be known under its common name as an "R-8" collet.

In a standard universal Bridgeport type universal milling machine, to release a tool therefrom, a draw bar, which extends through the spindle at the top of the machine head, has to be turned, so as to unscrew the lower end of the draw bar from the existing collet within the lower end of spindle. As the draw bar is unscrewed, the collet is pushed downwardly and the top of the draw bar is given a sudden sharp blow by a heavy object such as a wrench or a hammer. The collet is thus freed from the grip of the lower end of the spindle, and a new collet with a new tool therein, is put into the chuck of the spindle and the new collet is tightened into place by turning the top of the draw bar which turns the lower end of the draw bar into the female portion of the top of the collet. Such an operation can take between one and two minutes to complete in order to successfully change a tool in a vertical milling machine.

There are a number of patents amongst the prior art, which attempt to show arrangements for changing a tool in a milling machine. One such arrangement is shown in U.S. Pat. No. 2,135,861 issued to Thompson. This particular arrangement is for a broaching machine, and would not be utilized with a rotary milling machine inasmuch as it would gall any rotary member utilized therein.

U.S. Pat. No. 3,674,281 issued to Hedrick shows a tool chuck assembly with a spring which is utilized to press a ball against a wire/tool within a tapered cup. The spring however, is not pulling on the tool itself, it is utilized only for wedging engagement of a ball against the tool. U.S. Pat. No. 4,171,821 issued to Miller shows a quick change collet tool holder assembly. A spring however, merely holds the outside of a sleeve in position. This spring is not utilized to locate and position the tool in place. U.S. Pat. No. 4,322,190 issued to Anderson shows a mounting device for machining tools wherein a ball and a bar locking engagement to secure a milling cutter on the end of a spindle nose. U.S. Pat. No. 4,743,145 issued to Hendricks et al. shows a quick change drill chuck system which utilizes a hydraulic system for changing a nose piece of a tool. U.S. Pat. No. 4,768,282 issued to Reick et al., shows a tooling quick release change apparatus for a metal working machine. This arrangement permits the elimination of a draw bar mechanism commonly used in standard metal working machines.

It is the object of the present invention however, to provide a "Bridgeport" type universal vertical milling machine, having a manual tool advance arrangement, with a quick tool change mechanism for larger tools, which will also prevent the tools from coming loose.

It is yet a further object of the present invention, to provide a quick tool change mechanism which will be readily retrofittable in existing "Bridgeport" type "kneemill" manual universal vertical milling machines utilizing R-8 type collets.

It is yet still a further object of the present invention, to provide a quick tool release mechanism which will maintain tool accuracy and alignment after changing from one tool to another, while insuring that the tool will not slip or kick out.

Therefore, it is the object of the present invention, to provide an apparatus for retrofitting existing vertical type milling machines to permit them to have their tools changed and maintained more securely in the spindle, in a fraction of the time than it presently takes.

BRIEF SUMMARY OF THE INVENTION

The present invention involves a Bridgeport-type vertical milling machine having a manually adjustable tool feed arrangement thereon with an "R-8" type collet. This type of vertical milling machine includes a generally vertically disposed head, which rotatively encloses a vertically arranged spindle. The spindle is rotatively driven by a motor means connected thereto. The spindle comprises an elongated shaft, having a central bore therethrough. The spindle is supported within the head of the machine by a plurality of bearings. An elongated draw bar is arranged through the central bore of the spindle, extending from the uppermost end thereof, to a location adjacent to the lowermost end of the spindle.

The spindle is moveable upwardly and downwardly by a rack and pinion arrangement arranged on the side of the head. Up and down movement of the spindle is effected by rotative movement of a quill feed handle attached to the rack and pinion mechanism.

The lower end of the spindle encloses a collet. The collet is an elongated member having a first or a lower end into which a milling tool is secured. The collet has a tapered mid portion which is machined to a high tolerance, for engagement with a corresponding machined and/or tapered "engaging" portion of the spindle. The collet has a gripping head attached thereto at its other, or upper end. The gripping head comprises a generally spherically shaped enlarged engagement portion, having a neck which connects the enlarged portion to a base. The base includes a stud element which is screwed into the first or upper end of the collet. The collet includes at its upper end has a second band of closely machined surface, having a high tolerance, to permit intermating with a corresponding high tolerance machined portion of the spindle, so as to permit accurate alignment of a tool therewithin.

A coupling member is threadedly attached to the lowermost end of the draw bar. The coupling member mates with the generally spherically shaped head on the upper end of the collet.

The collet has a lower tool engaging end, having a bore for receiving and securing a milling/cutting tool therein. The lower end of the collet is of wider diameter than the outside diameter of the lower distal end of the spindle. The collet has a radially outwardly extending shoulder with a pair of engagement pins longitudinally arranged thereon.

The spindle has an arrangement of receiving bores longitudinally disposed on its distalmost end. The receiving bores are in alignment with the engagement pins extending longitudinally on the shoulder of the collet. The receiving bores may be machined directly into the face of the thickened wall at the lower end of the spindle. In a further embodiment, a collar may be securably attachable about the lower end of the spindle. The collar in this embodiment would have corresponding receiving bores machined therein. In either embodiment, the engagement pins are arranged to mate with the receiving bores of the spindle/collar. The engagement of the pins with the receiving bores promotes accuracy in angular alignment and prevents the collet and tool therein from coming loose from the spindle and the milling machine during operation of that machine.

In operation of the present vertical milling machine, when it is desired to change a collet and hence change a tool thereon, the machinist moves the quill feed handle to be in its uppermost position. The rotation of the collet end spindle is stopped. The machinist pushes the quill feed handle still further about fifteen degrees upwardly, so as to cause the spindle and draw bar to be pushed upwardly, and the spindle is moved upwardly to displace the spindle relative to the draw bar. The lower end of the spindle and the outer housing of the coupling wedged therein are also moved relative to the collet. The collet is thus readily removed from the lower alignment surfaces of the spindle. A second collet with a similar enlarged gripping head may then be inserted in its place and therefore, a new tool properly aligned within the spindle. The pins of the new collet are mated with the receiving bores annularly spaced about the circumference of the lower end of the spindle, to thus securely maintain the successive collet and tool therewith in the spindle for a new machining operation.

Thus, what has been shown is a highly securable quick release arrangement for a manual "Bridgeport" type vertical milling machine. The use of an annular array of receiving bores and mating pins between the lower end of the spindle and the collets which mate with the spindle provides a safe and secure arrangement for tools, while permitting their rapid and efficient change from one tool to another.

The invention thus comprises a tool/collet alignment and securement arrangement for a vertical milling machine having a J-head and a manually adjustable spindle for the secure and rapid change of a tool held in a collet in a lower end of said spindle, including an arrangement of receiving bores spaced annularly around the lower end of the spindle, and an arrangement of locating pins correspondingly arranged about the tool/collet so as to mate with the receiving bores in the spindle, to provide secure and efficient engagement of the collet/tool with the spindle. The spindle may include a collar spaced therearound, the collar having the receiving bores therein, in longitudinal alignment with the spindle. The collar may have a tightenable bolt arrangement therein so as to permit the collar to be tightenably secured to and removed from the lower end of the spindle. The lower end of the spindle may include an annular flange therearound, the annular flange having the receiving bores therein, in longitudinal alignment with the spindle. The lower end of the spindle may include an annular flange therearound, the annular flange having the locating pins extending circumferentially therefrom, in longitudinal alignment with the spindle. The tool and collet may include an annular shoulder therearound, the annular shoulder having an array of receiving bores extending circumferentially therein, in longitudinal alignment with the locating pins in the spindle.

The invention also includes a method of changing a milling tool on a manually operable vertical milling machine having a spindle rotatively supported therein, the spindle being movable vertically by a manually adjustable handle, comprising the steps of: providing a tool/collet with a radially extending shoulder thereon; arranging the spindle with a radially extending annular flange thereon, at the lowermost end of the spindle; providing a plurality of intermating locating pins and receiving bores in the shoulder and flange so as to permit their secure alignment when the tool/collet is mated within the lower open end of the spindle. The method may include the steps of: arranging the locating pins on the annular shoulder of the tool/collet; and arranging the receiving bores in the flange about the lower end of the spindle so as to permit their intermating and securing the tool/collet to the spindle.

The invention also includes a collet for a vertical milling machine having a J-head and a manually adjustable spindle for the rapid and secure change of a tool held in that spindle, the collet comprising: an elongated generally cylindrically shaped rotatable member having a first or upper end with a pull stud thereon for a mating engagement with a coupling; the collet having a mid portion with an annularly shaped shoulder extending circumferentially therearound. The shoulder may have a plurality of spindle securement means thereon, the collet having a tool secured within a lower end of the collet, the securement means permitting rapid and safe securement of the collet to a spindle of a vertical milling machine. The spindle securement means may comprise a plurality of longitudinally extending locating pins arranged to mate with an array of receiving bores disposed in a lower end of a milling machine spindle.

The collet of this invention is for a vertical milling machine having a J-head and a manually adjustable spindle for the rapid and secure change of a tool held in the spindle. The collet comprises an elongated generally cylindrically shaped rotatable member having a first or upper end with a pull stud thereon for a mating engagement with a coupling, the collet having a mid portion with an annularly shaped spindle abutting shoulder extending circumferentially therearound. The shoulder may have a spindle securement means thereon, the collet also having a tool secured within a lower end of the collet, the securement means permitting rapid and safe securement of the collet to a spindle of a vertical milling machine. The spindle securement means defines a channel, which channel receives a distalmost end of the spindle, the channel having an outer wall, a portion of which is radially adjustable to compress against the spindle to add gripping power thereto, to provide greater rigidity to a tool during a machining operation. The outer wall is comprised of a collar which is bolted to the radially extending shoulder of the collet, the collar and the collet defining the channel in which the lower end of the spindle mates. The collar has a gap thereacross, the gap having an adjustment bolt spanning the gap to permit the gap to be tightened and therefore the collar tightened about the lower end of the spindle. The collet is an R-8 type collet with a diameter of the shoulder portion exceeding the diameter of the spindle, so as to permit the collar to be secured thereto, and form a channel in which the spindle may mate.

BRIEF DESCRIPTION OF THE DRAWINGS

The objects and advantages of the present invention, will become more apparent, when viewed in conjunction with the following drawings, in which.

DESCRIPTION OF THE PREFERRED EMBODIMENTS

Figure 1:
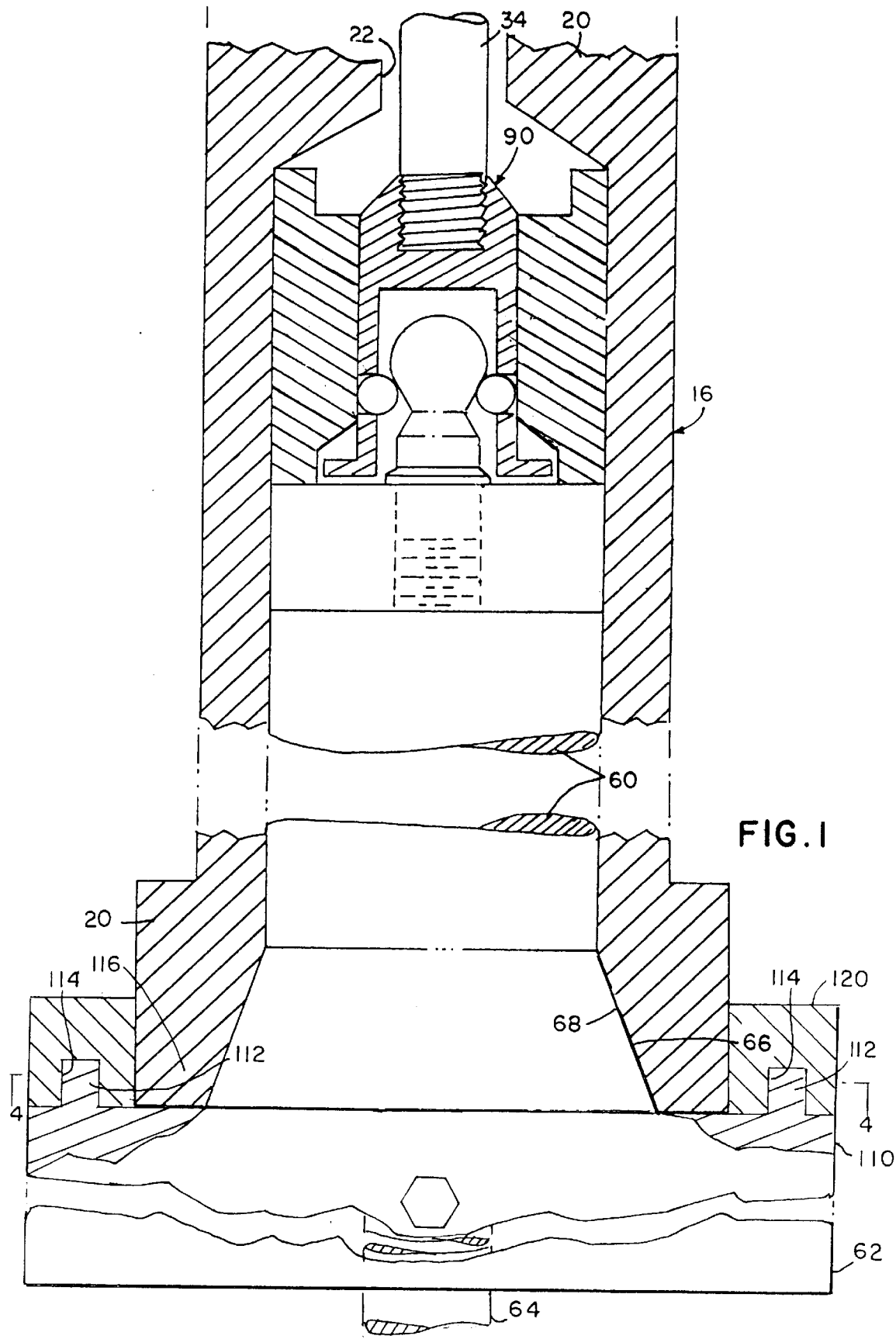
FIG. 1 is a side elevational view in section, showing a spindle and R-8 collet arrangement for a "Bridgeport" type vertical milling machine constructed according to the principles of the present invention.

Referring now to the drawings in detail, and particularly to FIG. 1, there is shown the present invention which comprises a spindle and collet/tool arrangement for a "Bridgeport" type vertical milling machine, which machine is embodied in my co-pending U.S. patent application Ser. No. 08/794,336, and which application is incorporated herein by reference in its entirety. This "Bridgeport" type of vertical milling machine rotatively encloses a vertically arranged spindle 16, only the lower portion being shown in the figures, for clarity. The spindle 16 comprises an elongated shaft 20, having a central bore 22 therethrough. An elongated draw bar 34 is arranged through the central bore 22 of the spindle 16, extending from the uppermost end thereof, to a location adjacent to the lowermost end of the spindle 16, as may be seen in FIGS. 1 and 2. The spindle 16 is moveable upwardly and downwardly by a rack and pinion gear arrangement, not shown herein, but is shown and described in my aforementioned co-pending application.

Figure 2:
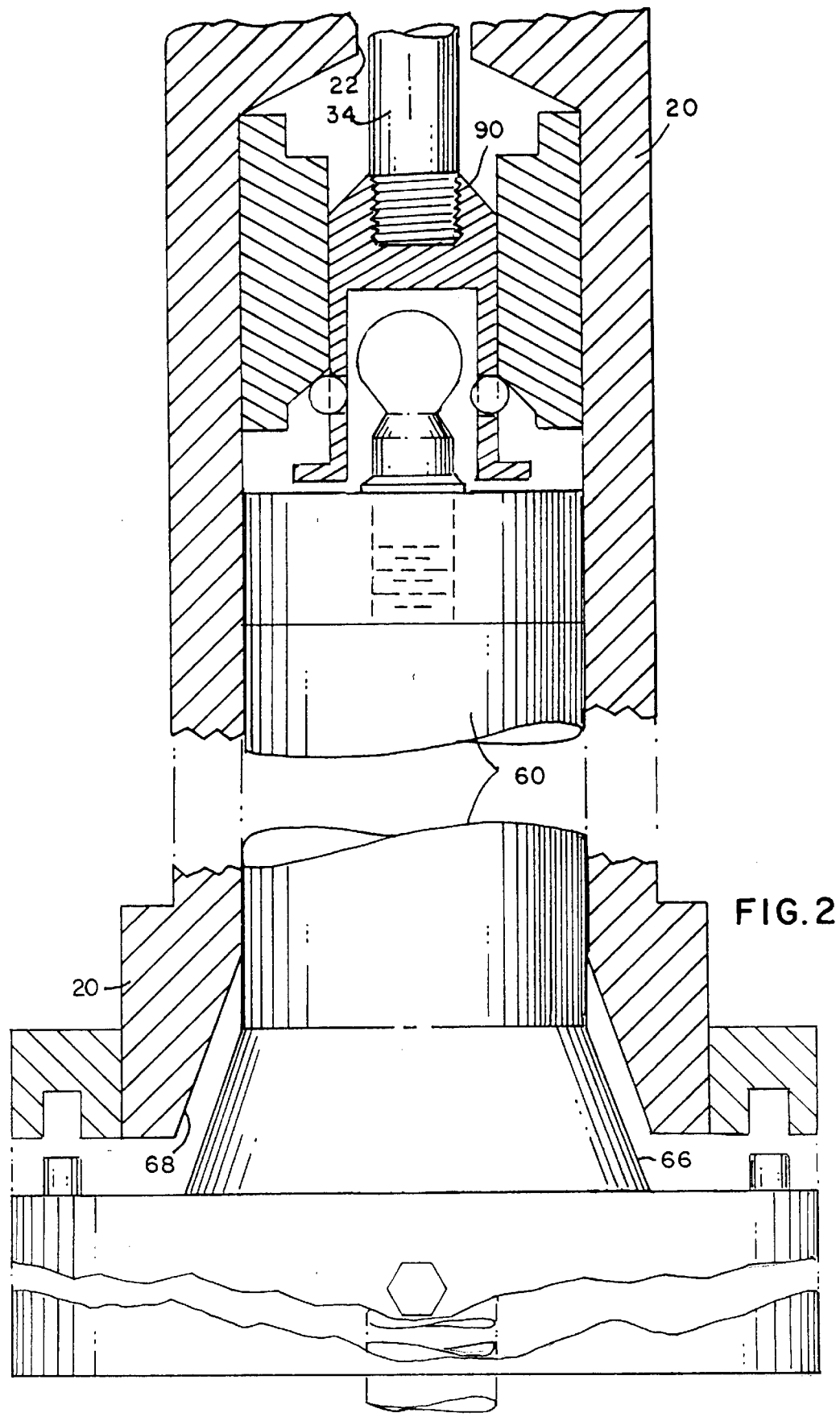
FIG. 2 is a view similar to FIG. 1 showing a subsequent step in the positioning of the components during a tool change operation therewith.

The lower end of the shaft 20, rotatively held in the lower end of the spindle 16, encloses a collet 60. The collet 60 is a slender elongated member having a first or a lower end 62 into which a milling tool 64, as best shown in FIGS. 1 and 2 is secured. The collet 60 has a tapered lower portion 66 which is machined to a high tolerance, for engagement with a corresponding tapered "engaging" lower portion 68 of the spindle 16. The collet 60 has a gripping head 70 attached to its upper end 72. The gripping head 70 and coupling member 90 permits threaded attachment to the lowermost end of the draw bar 34.

The collet 60 has a lower tool engaging end, having a bore for receiving and securing a milling/cutting tool 64 therein. The lower end of the collet 60 is of wider diameter than the outside diameter of the lower distal end of the spindle 20, as may be seen in FIGS. 1 and 2. The collet 60 has a radially extending shoulder 110 with a pair of engagement or locating/securement pins 112 longitudinally arranged thereon.

The spindle 20 has an arrangement of receiving bores 114 longitudinally disposed on its distalmost end 116. The receiving bores 114 are in alignment with the engagement pins 112 extending longitudinally on the shoulder 110 of the collet 60. The receiving bores 114 may be machined directly into the face of the lower end of the spindle 20. In a further embodiment, as shown in FIGS. 1 and 2, a collar 120 may be securably attachable about the lower end of the spindle 20. The collar 120 in this embodiment would have the corresponding receiving bores 114 machined therein. In either embodiment, the engagement pins 112 are arranged to mate with the receiving bores 114 of the spindle 20/collar120. The engagement of the pins 112 with the receiving bores 114 promotes accuracy in angular alignment and prevents the collet 20 and tool 64 therein from coming loose from the spindle 20 and its associated milling machine.

Figure 3:
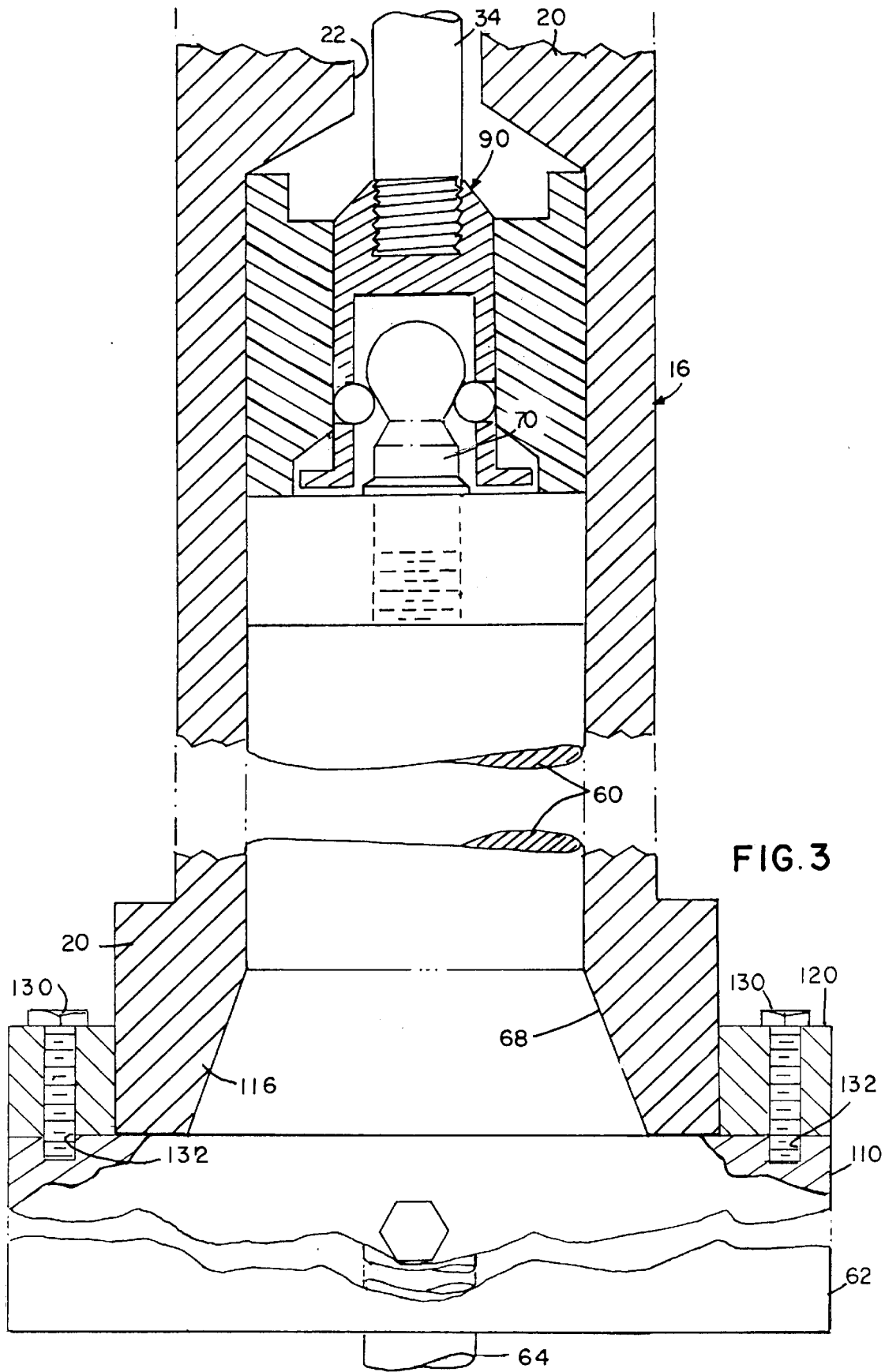
FIG. 3 is a side elevational view in section, showing a spindle and R-8 collet arrangement for a "Bridgeport" type vertical milling machine with the collet having a collar fixedly attached thereto, and constructed according to the principles of the present invention.

In a yet further embodiment, as shown in FIG. 3, the collar 120 may be permanently secured to the collet 60, by an arrangement of bolts 130 mating with bolt holes 132 around at least part of the circumference of the collar 120 and into the shoulder 110 of the collet 60. The bolts 130 are not secured completely circumferentially around the collar 120 because the collar 120 is split, and is arranged for at least one side thereof, to be movable against the lower end of the spindle 20. Such a collar 120 forms a channel in which the lowermost or distalmost end of the spindle 60 mates. Such engagement provides a strengthening and rigidity to the collet and tool especially when they are used for heavy machining. This type of collet/spindle engagement permits Bridgeport type vertical milling machines to do heavier machining work more efficiently. Such tightenability of the collet 60 to the spindle 20 is shown in FIG. 4, wherein one side of the collar 120 secured to the collet 60, is swingable and compressable against the outer surface of the lower end of the spindle 20, so as to provide rigidity in the tool and collet 60 during rough and heavy machining.

Figure 4:
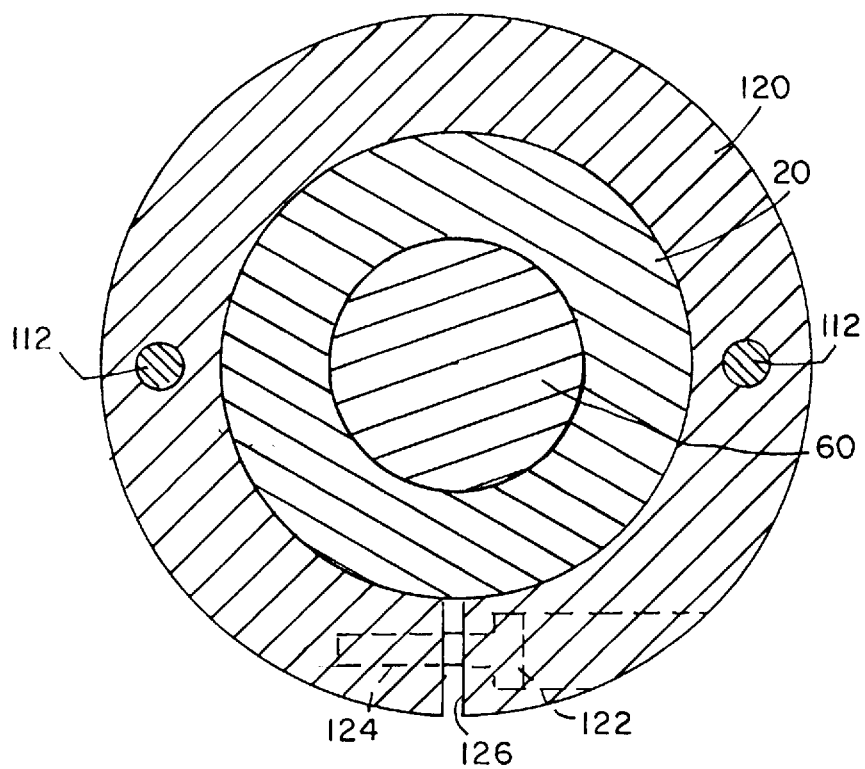
FIG. 4 is a view taken along the lines 4—4 of FIG. 1.

The collar 120 is shown again in a plan view in FIG. 4, with a bolt securement means 122 threaded into a bolt hole 124 across a gap 126 in one portion of the split collar 120. The bolt 122 permits the collar 120 (and tool 64) to be snugly and tightly secured to the spindle 20, permitting heavier machining than otherwise possible in the art, with a standard collet.

In operation of the present vertical milling machine, when it is desired to change a collet 60 and hence change a tool 64 thereon, the machinist moves the quill feed handle, shown in my co-pending application, to be in its uppermost position. The rotation of the collet end spindle is stopped. The machinist pushes the quill feed handle still further so that the lower end of the spindle 20 and the outer housing of the coupling 70 wedged therein are also moved relative to the collet 60. The collet 60 is thus readily removed from the lower alignment surfaces of the spindle 20. A second collet 60 with a similar enlarged gripping head may be inserted in its place and therefore, a new tool 64 properly aligned within the spindle 20. The outer pins 112 of the new collet 60 are mated with the receiving bores 114 securely and annularly spaced about the circumference of the lower end of the spindle 20, to thus securely maintain the successive collet 60 and tool 64 therewith in the spindle 20 for a new machining operation.

It is to be noted that in yet a further embodiment, the pins 112 may be arranged to extend from the lower end of the spindle 20 itself, and mate with corresponding receiving bores 114 within the annular shoulder 110 portion of the collet 60, (not shown for clarity), this being just a reversal of the direction shown of the pins/bores in the figures.

Thus, what has been shown is a highly securable quick release arrangement for a manual "Bridgeport" type vertical milling machine. The use of such an annular array of receiving bores and mating pins between the lower end of the spindle and the collets which mate with the spindle provides a safe and secure arrangement for tools, while permitting their rapid and efficient change from one tool to another.

I claim:

1. A tool alignment and securement arrangement for a vertical milling machine having a J-head and a manually adjustable spindle having a longitudinal axis, for the secure and rapid change of a tool held in a collet in a lower end of said spindle, comprising:

an arrangement of receiving bores spaced annularly around said lower end of said spindle;

an arrangement of locating pins correspondingly arranged about said tool so as to mate with said receiving bores in said spindle, to provide secure and efficient engagement of said collet/tool with said spindle; said spindle including a collar spaced therearound, said collar having said receiving bores therein in longitudinal alignment with said longitudinal axis of said spindle, said collar having a tightenable bolt arrangement therein so as to permit said collar to be tightenably secured to and removed from the lower end of said spindle; and wherein said collar has a tightenable bolt arrangement to secure said collar to said collet.

2. The tool alignment and securement arrangement for a vertical milling machine as recited in claim 1, wherein said lower end of said spindle includes an annular flange therearound, said annular flange having said receiving bores therein, in longitudinal alignment with said spindle.

3. The tool alignment and securement arrangement for a vertical milling machine as recited in claim 1, wherein said lower end of said spindle includes an annular flange therearound, said annular flange having said locating pins extending thereon, in longitudinal alignment with said spindle.

4. The tool alignment and securement arrangement for a vertical milling machine as recited in claim 2, wherein said collet includes an annular shoulder therearound, said annular shoulder having an array of receiving bores extending circumferentially therein, in longitudinal alignment with said locating pins in said spindle.

5. A collet for a vertical milling machine having a J-head and a manually adjustable spindle for the rapid and secure change of a tool held in said spindle, said collet comprising:

an elongated generally cylindrically shaped rotatable member having a first or upper end with a pull stud thereon for a mating engagement with a coupling;

said collet having a mid portion with an annularly shaped spindle abutting shoulder extending circumferentially therearound;

said shoulder having a spindle securement means thereon, said collet also having a tool secured within a lower end of said collet, said securement means permitting rapid and safe securement of said collet to a spindle of a vertical milling machine; and wherein said outer wall is comprised of a collar which is bolted to said radially extending shoulder of said collet, said collar and said collet defining said channel in which said lower end of said spindle mates.

6. The collet as recited in claim 5, wherein said spindle securement means defines a channel, which channel receives a distalmost end of said spindle, said channel having an outer wall, a portion of which is radially adjustable to compress against said spindle to add gripping power thereto, to provide greater rigidity to a tool during a machining operation.

7. The collet as recited in claim 5, wherein said collar has a gap thereacross, said gap having an adjustment bolt spanning said gap to permit said gap to be tightened and said collar to be tightened about said lower end of said spindle.

8. The collet as recited in claim 7, wherein said collet is an R-8 type collet with a diameter of said shoulder portion exceeding the diameter of said spindle, so as to permit said collar to be secured thereto, and form a channel in which said spindle may mate.

* * * * *